United States Patent
Mendoza-Castillo et al.

(10) Patent No.: US 6,386,376 B1
(45) Date of Patent: May 14, 2002

(54) PACKING FRAME AND SYSTEM FOR THE PACKING AND HANDLING OF GLASS SHEET PACKAGES

(75) Inventors: Marcial Mendoza-Castillo; Miguel Angel Amado-Aguilar; José Juan Villarreal-Gonzalez; Juventino Cesar Villarreal-Garza, all of Nuevo León (MX)

(73) Assignee: Vidrio Plano, S.A. de C.V., Garza Garcia (MX)

( * ) Notice: Subject to any disclaimer, the term of this patent is extended or adjusted under 35 U.S.C. 154(b) by 0 days.

(21) Appl. No.: 09/671,009

(22) Filed: Sep. 27, 2000

(30) Foreign Application Priority Data

Sep. 28, 1999 (MX) .............................................. 999899

(51) Int. Cl.[7] .................................................. A47F 7/00
(52) U.S. Cl. ................. 211/41.14; 224/403; 224/42.39; 206/454
(58) Field of Search .......................... 211/41.14, 41.1, 211/198; 206/454; 224/403, 42.39

(56) References Cited

U.S. PATENT DOCUMENTS

| | | | |
|---|---|---|---|
| 2,100,971 A | * 11/1937 | McDonald | |
| 2,518,624 A | * 8/1950 | Kraft | |
| 3,424,487 A | * 1/1969 | Pector et al. | |
| 3,848,917 A | * 11/1974 | O'Neal | |
| 3,878,942 A | * 4/1975 | Hansen et al. | ............... 206/454 |
| 4,278,171 A | * 7/1981 | Milhoan | ............... 206/454 X |
| 4,278,175 A | 7/1981 | Jackson | ............... 211/41 |
| 4,304,336 A | * 12/1981 | Mays | ............... 211/41.14 |
| 4,626,017 A | * 12/1986 | Robertson | |
| 4,864,939 A | 9/1989 | Bailey et al. | ............... 108/44 |
| 5,085,329 A | * 2/1992 | Crowell et al. | ............ 211/19.5 |
| 5,148,924 A | * 9/1992 | Mason et al. | ............ 211/41.14 |
| 5,755,339 A | * 5/1998 | Belanger et al. | ......... 211/41.14 |
| 5,860,539 A | * 1/1999 | Brown | ............... 211/41.14 X |

* cited by examiner

Primary Examiner—Robert W. Gibson, Jr.
(74) Attorney, Agent, or Firm—Abelman, Frayne & Schwab (57) ABSTRACT

The present invention is referred to a packing frame and a system for packing and handling glass sheets. The structure being formed for at least two supporting sections, each supporting section including at least two structural profiles which are connected in the upper part and are separated in the lower part. In lower part of each profile is attached a support profile, in a horizontal position, which is connected to the lower part of the structural profiles, forming a base for each one of the supporting sections. The horizontal profile having a first supporting section and a second supporting section, both supporting section being of a major extent, on each side of the supporting section in order to support a series of glass sheet packages. Each one of the supporting sections being placed in a relation one in front to the other, which are joined by crossing members forming the assembly of the supporting frame. Posts are equidistantly distributed in different places of each supporting section, wherein a plurality of strapping bands are extended around the glass sheet packages and posts, in order in order to maintain together a group of individual glass sheets packages, on both sides of the supporting frame.

20 Claims, 8 Drawing Sheets

PACKING FRAME AND SYSTEM FOR THE PACKING AND HANDLING OF GLASS SHEET PACKAGES

FIELD OF INVENTION

The present invention refers to a frame and a packing and handling system of glass sheets or similar materials, which can be located on the platform of a loading transport truck, and more particularly, to a frame and a packing and handling system of glass sheet packages.

BACKGROUND OF THE INVENTION

At present, several frames for the transportation of large sheets of glass are known. These frames are placed on the platform of freight trucks for transporting articles from one place to another. One of the best know frame is made out of a wooden base (called a "wooden bed frame") which is tightly set over the freight truck platform. In this case particular, the glass sheets are loaded towards, and in coincidence with the platform by means of a pair of operators, who first need to lift the end of the glass sheet to place it over the frame's shock absorbing mattress, over which is placed the end of the glass sheet, and later, said glass sheet is pushed into a vertical position until it is leaning over the first wall of the frame (the wooden bed frame) which leans at approximately 120° with respect to the horizontal line of the platform. This operation is repeated several times until a many glass sheets are leaning on each side of the frame.

Once that several glass sheets have been piled over the frame of the freight truck, they are covered with canvass, and later, they are secured with cables for their transportation.

An example of the frames used for transporting large glass sheets is shown in U.S. Pat. No. 4,278,175 issued to Archie A. Jackson. In this case, the frame is fixed and is placed laterally over a freight transport truck, which considers the floor level as a factor for loading and unloading the glass sheets.

Another form of transporting glass sheets is shown in the U.S. Pat. No. 4,864,939 issued to Kent A. Bailey, which shows a removable supporting frame which can be easily coupled to the back end of the frame of a freight truck. A plurality of pipes that contain a plurality of hooks on an end are used to connect the supporting removable frame onto the truck's frame.

However, the previously described loading systems are useful for delivering glass sheets within a small geographic area, wherein the glass sheets can be handled individually.

Notwithstanding the above, when large quantities of glass sheets need to be sent to places that are further away, the glass sheets must be packed in wooden packages for their easy transport. The stated wooden packages are placed over a set frame that is in the rear of the transport trucks (for their transportation) and, later, once that they arrive to their destiny and they are unloaded one by one, for their storage in warehouses.

However, one of the disadvantages of the handling of glass sheets is when they have to be transported by railroad or via a waterway or to other ports or countries. i.e., the trucks with the glass sheet packages arrive to the railroad stations or the maritime ports, where they are unloaded one by one to be placed in the railroad boxcars or in the storage bins of boats.

Through this procedure, the loading and unloading of the glass sheets packages is time-consuming, and therefore the handling costs rise. This same procedure is repeated when the packages arrive in another station or port, where a truck with a platform must be available for the unloading and reloading of the glass sheets.

In order to save time and consequently reduce handling and transportation costs of large glass sheets, the inventors of the present invention designed a packing frame and a system for transporting large sheets of glass or similar materials which are transported together with the glass sheets, thus facilitating their packing and handling.

Said removable frame that goes on the back end of the truck, which facilitates loading, for transporting and unloading of the glass sheets. This frame is placed over the platform of a freight truck, which is fastened onto the truck platform itself for transportation. Once the freight truck arrives to its destiny, the frame, together with the glass sheet packages is lifted by means of a crane, to facilitate the loading and unloading of the glass sheets onto the railroad boxes, or into the storage area of boats.

The packing and handling system for glass sheets, includes two supporting sections and at least two structural profiles, said structural profiles being in coincidence with the upper part of a first distance of reference A, and are separated one from the other in the lower part at a second distance of reference B; at least one reinforced bar is located transversally between the structural profiles in order to reinforce the transversal supporting section formed by said structural profiles; a third supporting profile, horizontally connected to the lower part of said structural profiles, said third supporting profile having a first lower supporting section to a first side of the frame formed by the structural profiles that goes beyond the limit which is formed by said profile frames and a second supporting section on a second side of said frame formed by the structural profiles, opposite to the first side, also goes beyond the limit that forms the frame made by said structural profiles, said first and second supporting frame being used for loading a series of packages of glass sheets; at least one first post for each one of the structural profiles, each one of the posts of each structural profile is located in the upper part in a position of one below the other; second posts are coupled over the supporting profile, which are separated one from the other, by a distance that is greater than or equal to the B separation distance that is established for the structural profiles; and, third posts are located over the profile of support, at a third distance of reference C, said third posts being aligned horizontally with respect to the second posts of said supporting profile, wherein each one of the supporting sections are located in a relation one front of the other and are joined by crossing members for the assembly of a supporting frame; a first plurality of fastening bands are extended over the first and second series of the packages containing sheets of glass, each being hooked to the first, second, and third posts, and over the edges of the glass sheets, thus holding a series of individual glass sheet packages to each of the sides of the supporting frame.

OBJECTIVES OF THE INVENTION

Therefore, it is a first objective of the present invention to provide a frame and a packing system for handling large sheets of glass, which facilitates their handling and transportation.

An additional objective of the present invention is to provide a frame and a system for packing and handling of packages for large sheets of glass or similar materials that are easy to place and remove from a freight truck, a boat or railroad platforms.

An additional objective of the present invention is to provide a frame and a packing and handling system of glass sheets which can be adjusted to the different dimensions of the packages that contain the sheets of glass.

Another objective of the present invention is to provide a frame and a packing and handling system of glass packages which can be assembled and disassembled at the time of glass sheet loading and unloading occupying a minimum space when the loading and unloading frame is returned to its place of origin.

Still another objective of the present invention is to provide a frame and a packing and handling system of glass sheet packages, which reduce the time it takes to tie the glass sheets and which, in addition, provide a greater safety during their transportation.

These and other objectives and additional advantages of the present invention will be made evident to experts in the field in the following detailed description of the invention, which will make reference to two specific embodiments of the invention in an illustrative, but not limiting, sense.

DETAILED DESCRIPTION OF THE INVENTION

Figure 1:
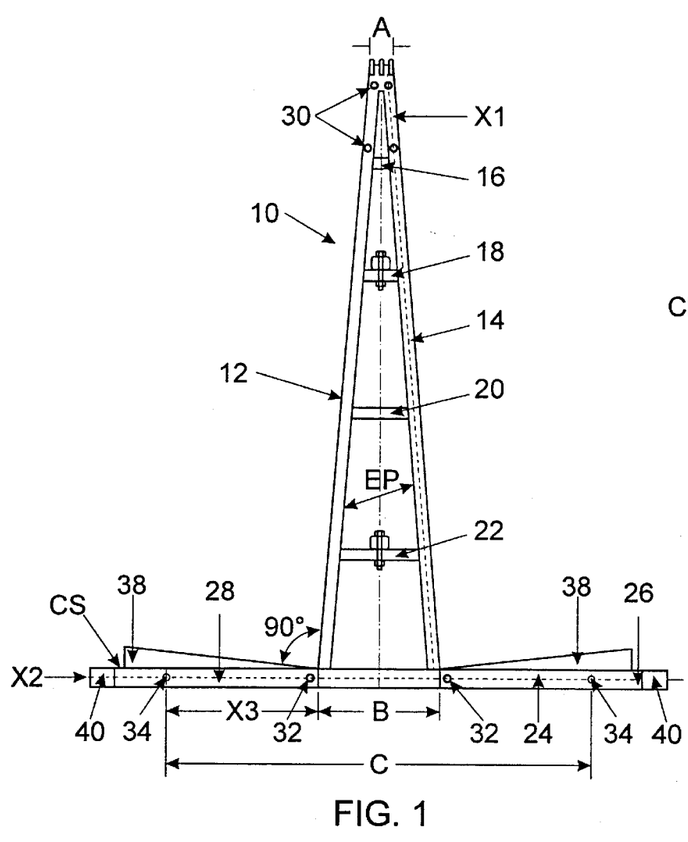
FIG. 1 is a lateral view of a supporting section of the packing frame for glass sheet packages, in accordance with the present invention.

Now reference will be made of a specific embodiment of the present invention, illustrated in the figures that are attached to the present write-up, where the same numbers refer to the same parts and where FIG. 1 shows a first section of support, 10, and how it is part of the total support system for the packaging and handling of LV glass packages, in accordance with the present invention.

Figure 2A:
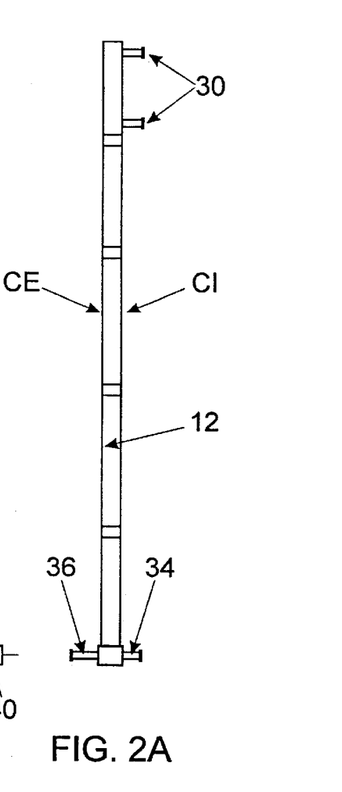
FIG. 2A is a lateral view with a 90° angle of the supporting frame showed in FIG. 1.
Figure 2B:
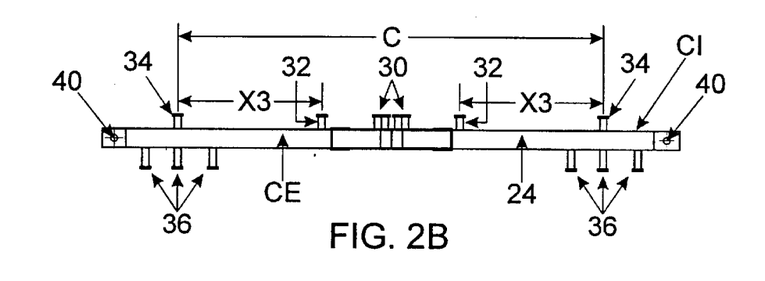
FIG. 2B is a plant view, taken from FIG. 1, showing an upper view of one of the parts of the supporting frame.

As FIGS. 1, 2A and 2B illustrate, the first section of support 10 is made up of two square structural profiles 12, and 14, said two structural profiles 12, 14, being in coincidence in the upper part at a first distance of reference A, and, being separated from each other in their lower part at the second distance of reference B, so they form between them a frame in the shape of a pyramid EP; reinforcing bars 16, 18, 20, 22, are transversally located between the two structural profiles 12, 14, in order to reinforce the pyramid frame EP made up by the structural profiles 12, 14; and a third supporting profile 24, which is horizontally connected in the lower part of said structural profiles 12, 14, said third supporting profile 24 forms the base of the pyramid frame EP, and said supporting profile frame 24 having a first supporting section 26 on a first side of the pyramid frame EP, which goes outside the limit that is formed by said lower pyramid frame EP, and a second supporting section 28, on the opposite side of the pyramid frame EP, which also goes outside the limit that forms the lower pyramid frame EP; said first and second supporting sections 26, 28, are used for loading a series of sheets of LV glass (see FIGS. 5, 6, 7 and 8).

Making specific reference to FIG. 2A, the pyramid frame EP is shown with its structural profile 12, in a side view, showing an internal face CI and an external face CE. Over the internal face CI of the structural profile 12, a first pair of posts 30, are illustrated as located in the upper part, one under the other, aligned in the first line of reference X1 (FIG. 1). Each pair of posts 30 are connected in a perpendicular position with respect to the external face CE of each one of the structural profiles 12, 14.

Making reference to FIGS. 1, 2A, and 2B, the supporting profile 24 includes, additionally, a second pair of posts 32, each one located in the supporting profile 24, separated one from the other by an equal or greater distance to the distance B established for the structural profiles 12, 14 (FIGS. 1 and 2A). Said posts 32, are also connected in a perpendicular position with respect to the external part the supporting profile 24.

Third posts 34 placed between a third distance C, on the supporting profile 24, which are aligned with respect to the second posts 32, in a second axle of reference X2. The distance X3 between each one of posts 32 and 34, being defined by the number of glass sheet packages to be transported. Said posts 34, are also connected in a perpendicular position with respect to the external part of the supporting profile 24.

On the opposite part (the external face of CE) of the supporting profile 24, a series of supporting posts 36 (three or more for each side), which are used for tying all of the glass sheet packages are located, as will be described further on. Said posts 36, are connected in a perpendicular position with respect to the outer face CE of the supporting profile frame 24.

Figure 3:
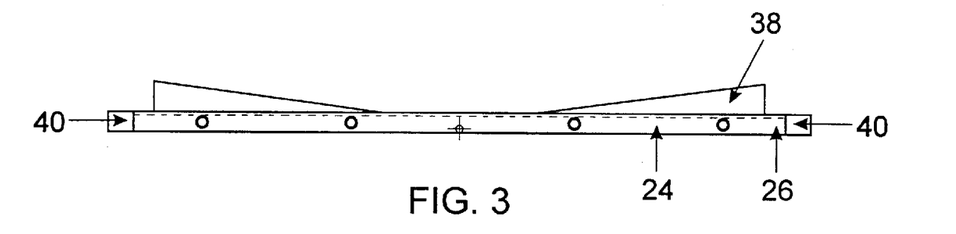
FIG. 3 is a lateral view of the supporting frame illustrated in FIG. 1, showing the lower part of the supporting frame in detail.

Over the upper face CS of the first and second supporting section 26, 28 of the supporting profile 24, an angular piece 38 is placed (FIG. 1 and 3), which forms a 90° angle with respect to the inclination of each one of the structural profiles 12, 14, which make up the pyramid frame EP, to retain a series of packages for sheets of glass sheet by its upper part.

Finally, at each end of the supporting profile 24 (FIG. 2B), a sliding piece 40 is located. Said sliding piece 40 is adjusted to each end of the supporting profile 24 at the moment that the supporting frame of the present invention is placed over the platform P (FIG. 8) of a loading truck (not shown).

Figure 4:
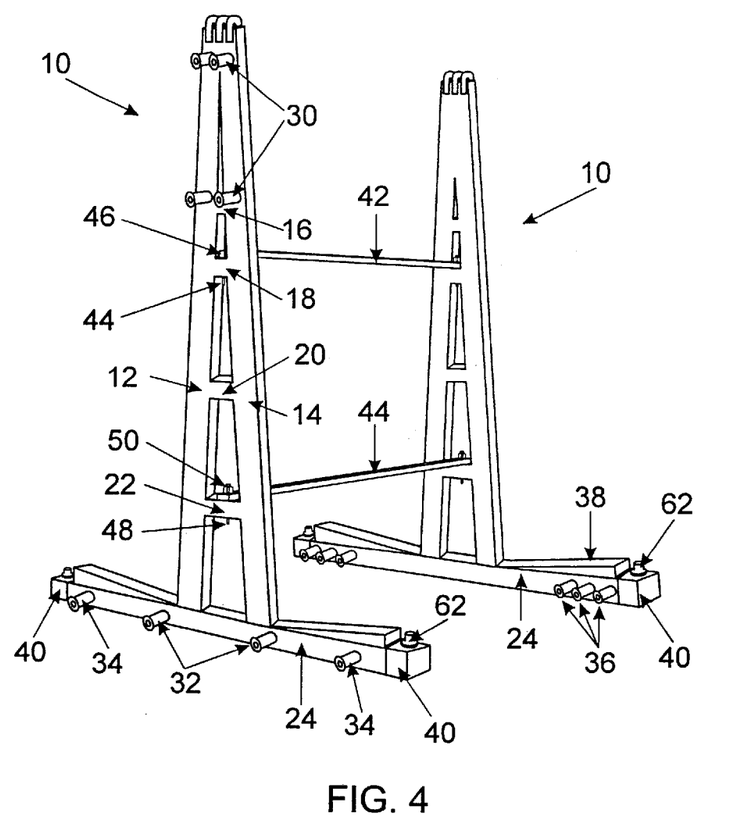
FIG. 4 is a conventional perspective view of the assembled supporting frame, in a first embodiment of the present invention.

Now making particular reference to FIG. 4, the assembly of the complete frame for the packing and handling of packages for sheet of LV glass, is carried out through the use of two supporting sections 10, which are placed one in front of the other. The position of the supporting frames 10 can be different. However, in a preferred embodiment, the posts 32 and 34 must be placed towards the outside or the external part of each supporting frame 10. The supporting sections 10 are joined by a first crosspiece 42 and a second crosspiece 44. The ends of the first crosspiece 42 are placed respectively over each one of the reinforcing bars 18, of each one of the supporting sections 10. Each end of the first crosspiece 42, and each reinforcing bar 18 are joined through a group of screw 44, and nut 46. Similarly, the coupling of the second crosspiece 44 is carried out by means of a reinforcing bar 22, of each one of the supporting sections 10, through a second group of screw 48 and nut 50.

Once the complete frame has been assembled, packages of sheet glass 52, are placed on each side of the supporting frames 10 (FIG. 5), the glass sheet packages 52, until a series of equal packages are loaded 52, on each side of said support sections 10.

Figure 5:
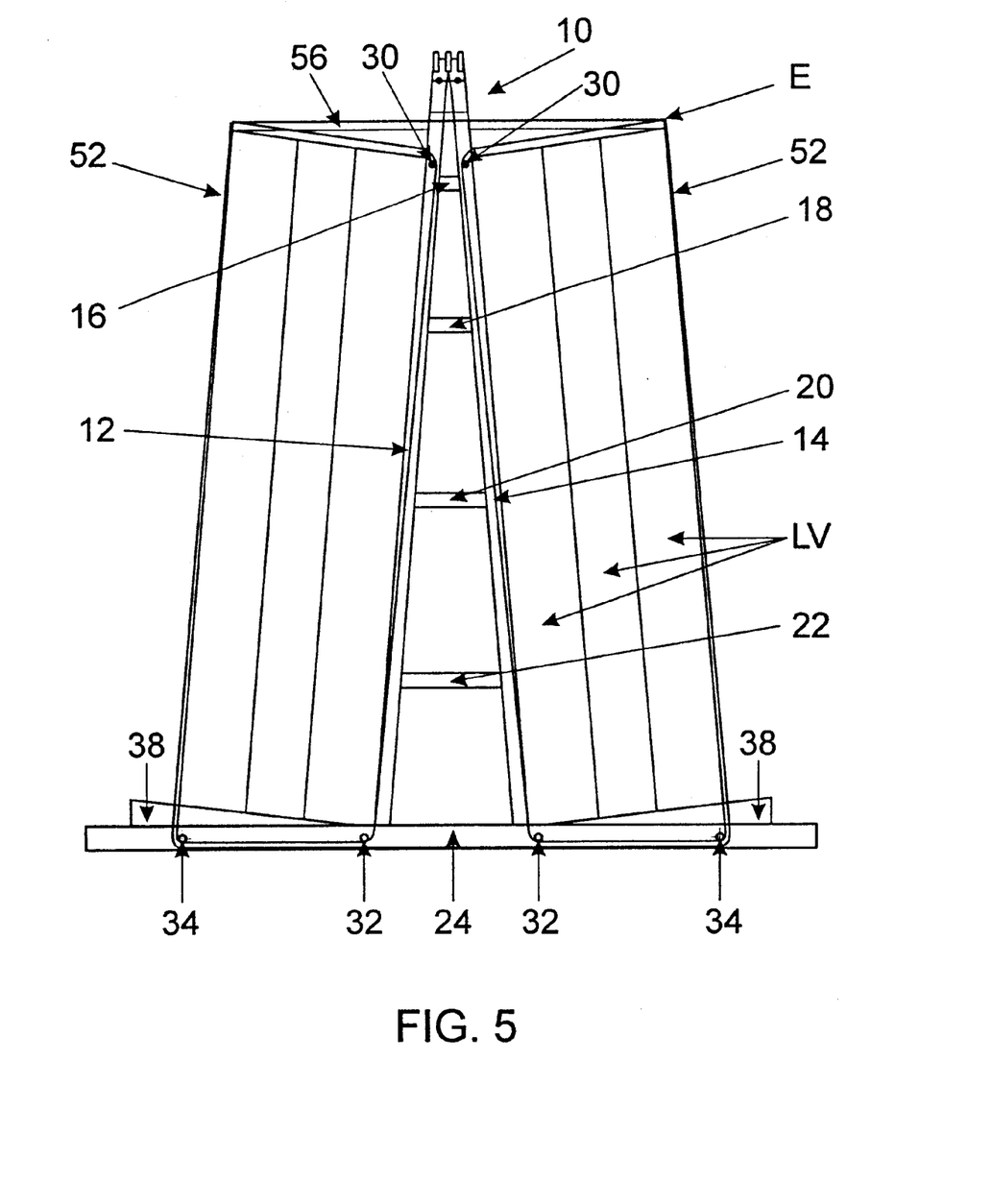
FIG. 5 shows a profile view of the assembly of various glass sheet packages, placed over the supporting frame of the present invention.
Figure 6:
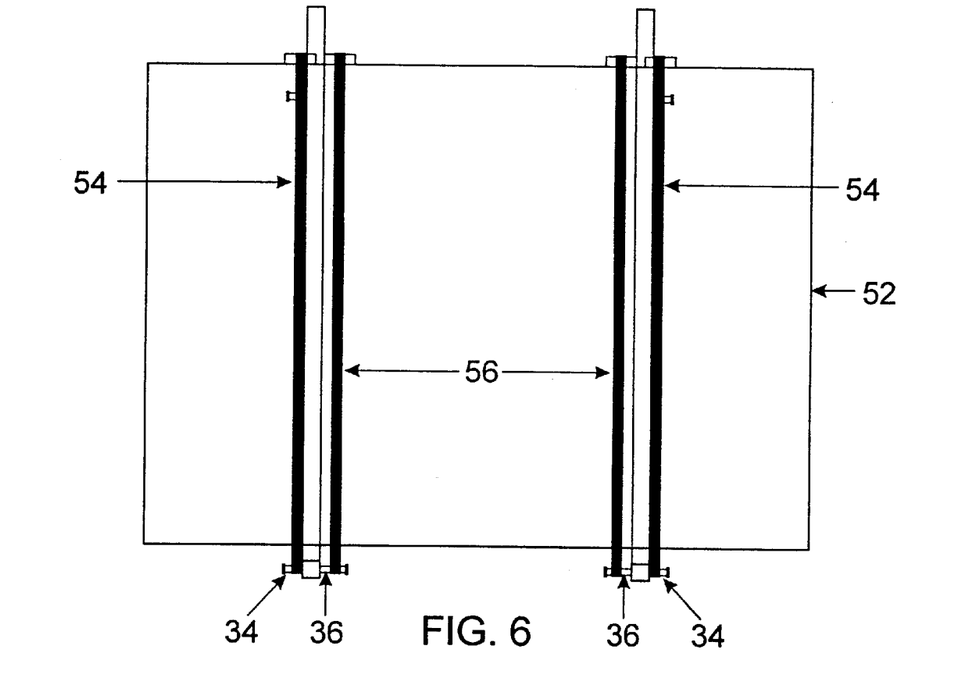
FIG. 6 shows a lateral elevated view showing the manner in which the glass sheet packages are held in the lateral part of the supporting frame.
Figure 7:
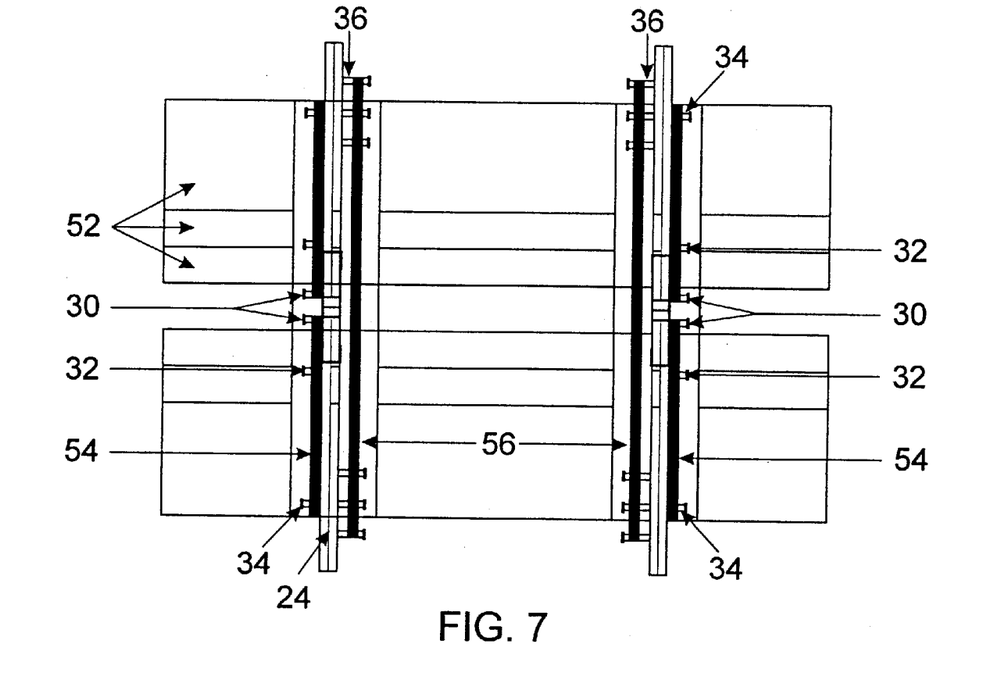
FIG. 7 is a plant upper view taken from FIG. 5, which shows the manner of tying the packages of sheet of glass.

Once the loading of the glass sheet packages has been finished 52, over each side of the supporting frames 10, they are tied individually by each section 10 (FIGS. 5, 6 and 7), this is, a first a binding belt 54 extends around the first package of LV glass sheets and is passed over the posts 32 and 34 of the supporting profile 24, over the lower post 30 of the pyramid frame EP, and over a corner of E of the glass sheet packages LV, until a first glass sheet package is fastened. This process is repeated three times, as is shown in FIGS. 5 and 7.

Later, a second strapping belt 56 is extended over all of the group of glass sheet packages 52, said second strapping belt 56 is passed over any one of the posts 36 (depending on the width of the packages and the number of glass sheets to be transported) and extends over the corner E of the sheet glass packages 54. Finally, all of the glass sheet packages and the supporting frames are placed over the platform P (FIG. 8) of a freight truck (not shown).

Figure 8:
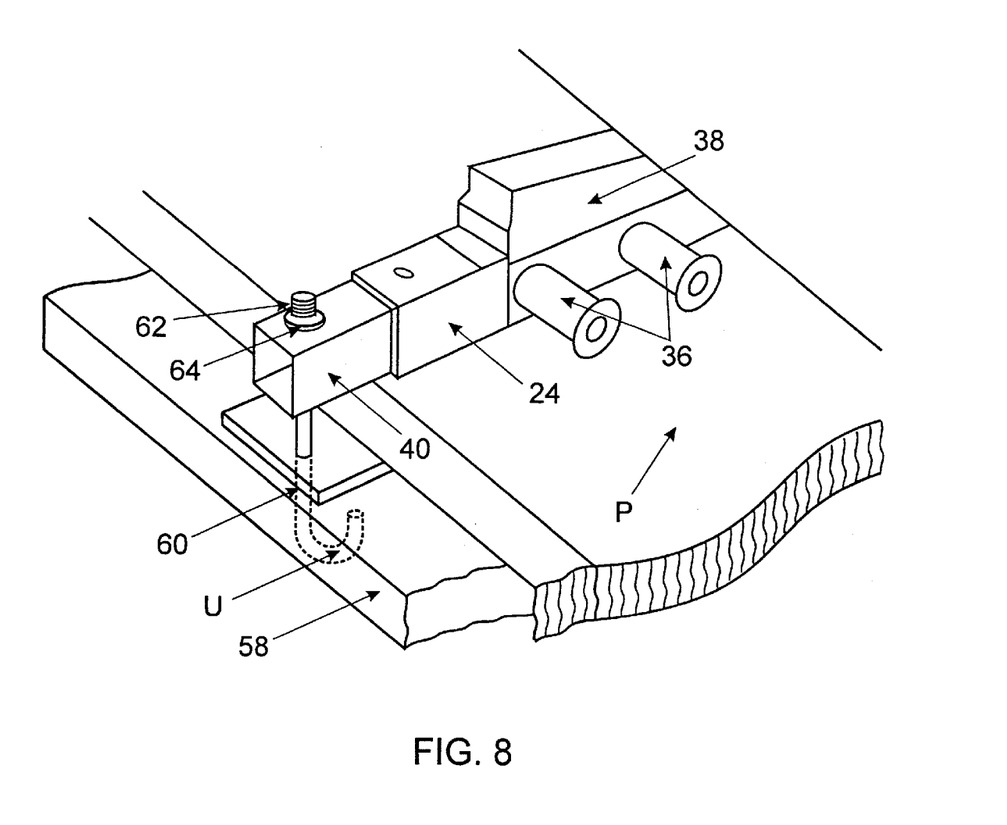
FIG. 8 is a detailed view showing the coupling elements of the supporting frame and its connection over the freight truck platform.
Figure 9:
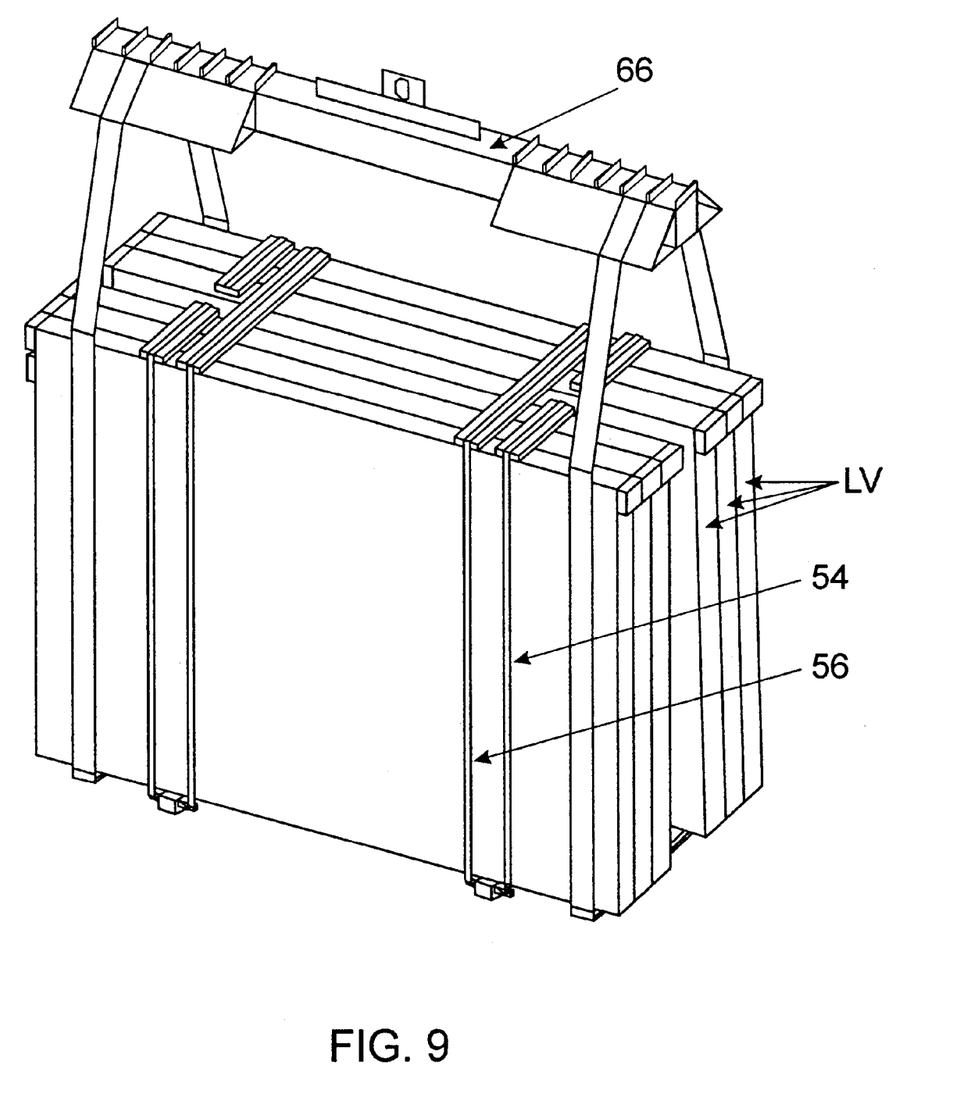
FIG. 9 is a conventional view in perspective showing the supporting frame of the present invention during its handling.

Once the frame and the glass sheet packages are placed over the platform P. the sliding piece 40 is placed at each one of the ends of the supporting profile 24, which is adjusted in keeping with the platform P of the truck (not shown), until reaching the end of the running board 58. A fastener 60 that has an upper end that is threaded 62, and a lower end that has the shape of a U hook, is provided to fasten the supporting frame to the truck's platform P. The U shaped hook is placed under the end of the running board 58, of the truck and to the upper end 62 that crosses the sliding piece 40. A nut 64, is placed over the upper threaded end 62, to fasten the sliding piece 40, to the running board of the truck, thus finishing the loading of the glass sheet packages, using the supporting frame of the present invention. FIG. 9 shows how to transport all of the assembly of the supporting frame and the sheets of glass LV through a system of bands 66, of a package, such as are used in land or maritime embarkation ports.

Figure 10:
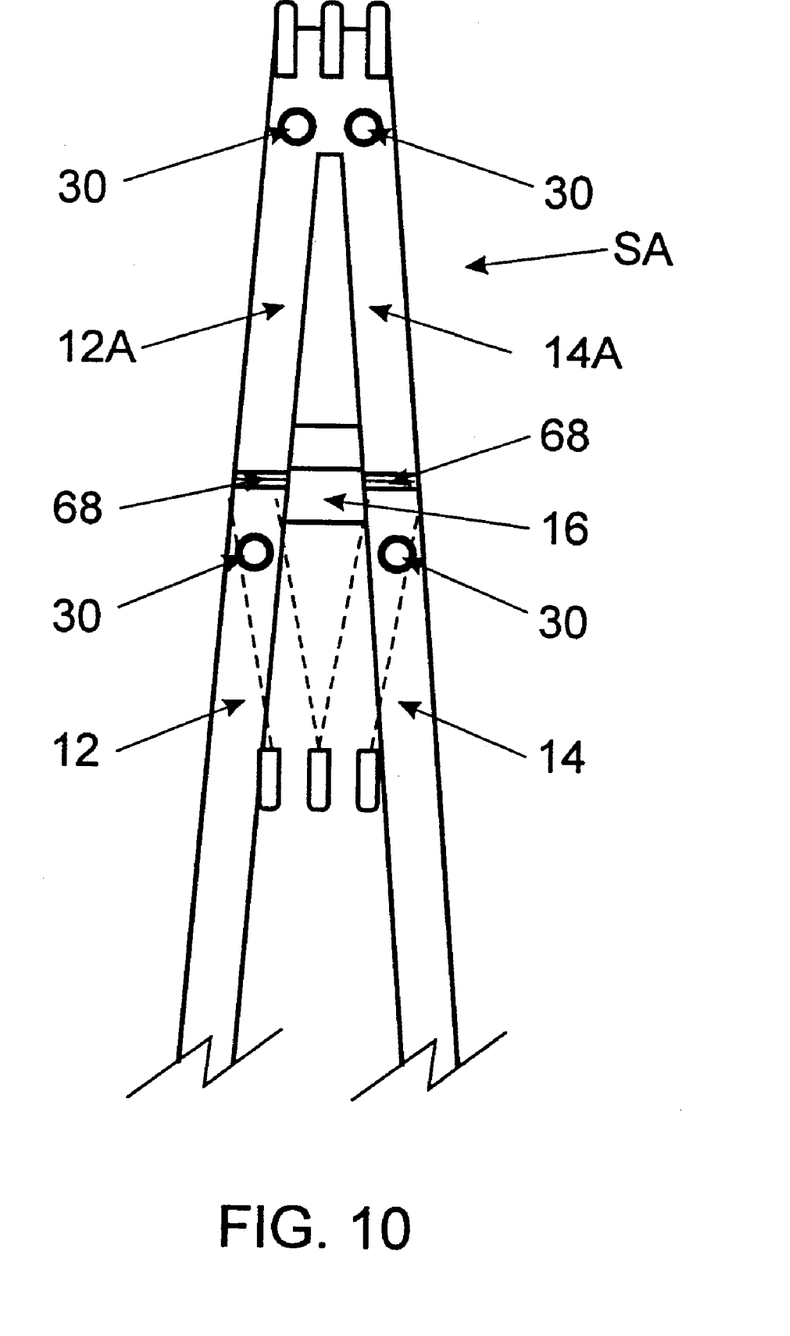
FIG. 10 shows a sectional view of the upper part of the frame shown in FIG. 1, in a second embodiment of the present invention; and, FIGS. 11A and 11B show a lateral view of FIG. 10, displaying the upper part of the frame in its folded embodiment.
Figure 11A:
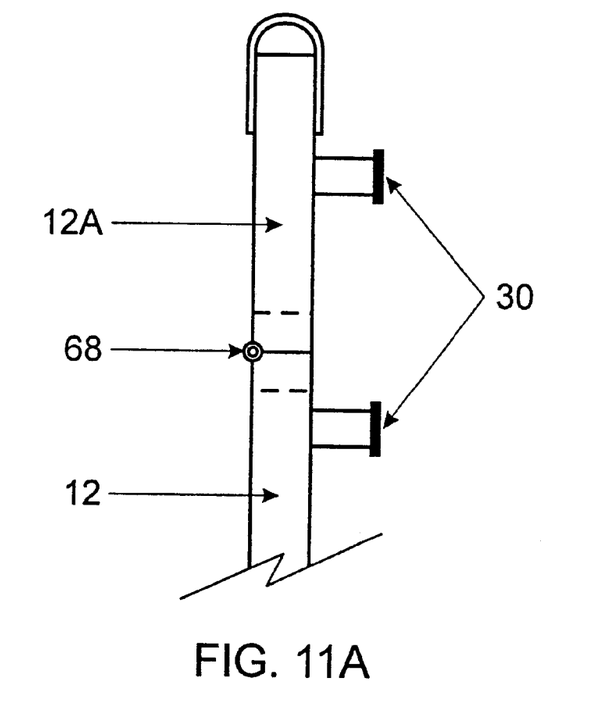
Figure 11B:
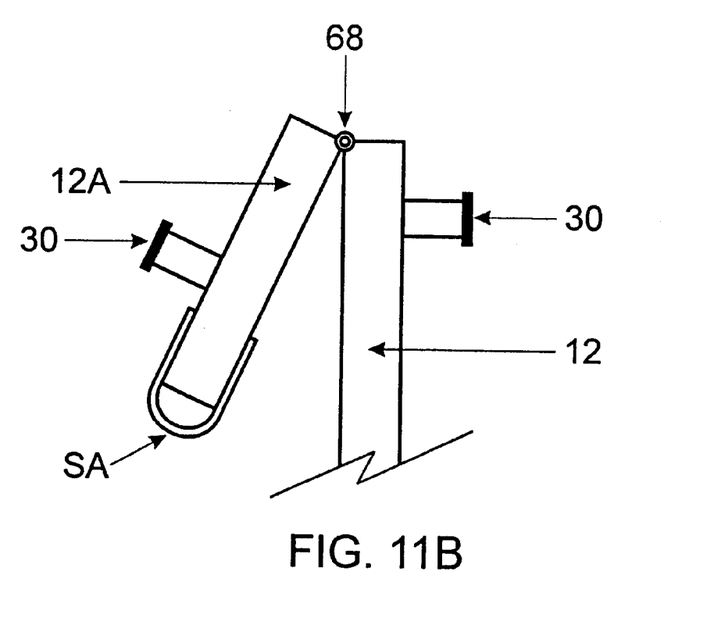

In a second embodiment of the present invention, FIGS. 10, 11A and 11B are seen in a cross cut taken of FIGS. 1 and 2A, wherein the upper part of the supporting frame is shown in its folded form. That is, when the glass sheet packages are smaller than its height, the upper part of the support frame can be folded in. In this case, the upper part of the structural profiles 12 and 14, include an upper folding section SA, which is formed by two profile structural sections 12A, 14A, which are linked together a joint, for example a group with a hinge with a stud 68. In this manner, the folding section SA can be folded in by moving it downwards up to a 180° angle.

Even though a specific manner of a frame and a packing and handling system for glass sheets which offer greater safety in their transport has been described, it should be understood that the invention must not be limited to the embodiment shown above, and it will be apparent for the experts in the field that other presentations can be implemented, as well as alternate executions which are clearly contained within the spirit and scope of the present invention, which are pointed out the following claims.

We claim:

1. A frame for packing and handling glass sheets, said frame comprising:

a first section support and a second section support, each first section support and second section support comprising a first structural profile (12) and a second structural profile (14), said first structural profile and said second structural profile converging in an upper end and being separated at the lower end; reinforced bars (16, 18, 20, 22) which transversally connect the first structural profile and the second structural profile; a third support profile (24) horizontally connected in the lower part of said first structural profile and said second structural profile; said third support profile having a first lower supporting section (26) in a first side of the first structural profile and a second lower supporting section (28) in a second side of the second structural profile, said first lower supporting section and second lower supporting section being used for supporting a series of packages of glass sheets;

at least one first post (30) coupled by each one of said first structural profile and said second structural profile, each one of the posts being disposed generally perpendicularly with respect to the upper part of said first and second structural profiles;

second posts (32) which are generally perpendicularly coupled on the third support profile, which are separated from one another between a first distance (B); and, third posts (34) coupled over the third support profile, which are separated between a second distance of reference (C), said second posts and said third posts being aligned in the same horizontal plane with respect to said third support profile;

crossing members (42, 44) connecting said first section support and said second section support for assembling the complete frame; and, adjusting means (40) at each end of said third support profile, whereby said frame can be adjusted over a platform of a loading truck.

2. The frame for the packing and handling of glass sheets as claimed in claim 1, wherein the adjusting means comprises fastening means for coupling on said platform.

3. The frame for the packing and handling of glass sheets as claimed in claim 1, wherein the first support section and the second support are in pyramidal form.

4. The frame for the packing and handling of glass sheets as claimed in claim 1, wherein the assembling between the first section support, the second section support and the crossing members are carried out by means of a nut and screw assembly.

5. The frame for the packing and handling of glass sheets as claimed in claim 1, wherein the first structural profile and the second structural profile comprise an upper folding section.

6. The frame for the packing and handling of glass sheets as claimed in claim 5, wherein the upper folding section and an upper part of said first structural profile and said second structural profile are connected by means of a joint.

7. A system for packing and handling glass sheets of type that comprises a frame, said frame having a first section support and a second section support, each first section support and second section support including a first structural profile and a second structural profile, said first structural profile and second structural profile converging in an upper end and being separated at the lower end; reinforced bars which connect transversally the first structural profile and the second structural profile; a third support profile horizontally connected in the lower part of said first structural profile and said second structural profile, said third support profile having a first lower supporting section (26) in a first side of the first structural profile and a second lower supporting section (28) in a second side of the second structural profile, said first lower supporting section and second lower supporting section being used to support a series of packages of glass sheets; at least one first post coupled by each one of said first structural profile and said second structural profile, each one of the posts being disposed generally perpendicularly with relation to the upper part of said first and second structural profiles; second posts (32) which are generally perpendicularly coupled on the third support profile, which are separated one from the other between a first distance (B) and, third posts coupled over the third support profile, which are separated between a second distance of reference (C), said second post and said third posts being aligned in a same horizontal plane with respect to said third support profile; crossing members (42, 44) connecting said first section support and said second section support for assembling a complete frame; and, a first plurality of strapping bands which extend around the glass sheet packages, which are passed for engaging the first posts, second posts and third posts of said complete frame by each group of glass sheets packages, in order to maintain together a group of individual glass sheets packages on both sides of the frame.

8. The system for packing and handling glass sheet as claimed in claim 7, wherein the third support profile further comprises: supporting posts located in an opposite position to said second posts and said third posts of said third support profile; and a second plurality of strapping bands which extend around each of the glass sheet packages and passed for engaging each one of said supporting posts, as an additional support for tying of the glass sheet packages.

9. The system for packing and handling glass sheets as claimed in claim 7, wherein the separation between each of the second posts and third posts is defined by the numbers of glass sheets packages that will be transportd.

10. The system for packing and handling glass sheets as claimed in claim 7, wherein the first posts are coupled in a horizontal position with respect to the structural profiles.

11. The system for packing and handling glass sheets as claimed in claim 7, wherein the second posts and the third posts are coupled in a horizontal position with respect to the third support profile.

12. The system for packing and handling glass sheets as claimed in claim 7, wherein the third support profile comprises supporting posts located in an opposite direction to the second posts and third posts, which are used for tying the glass sheet packages.

13. The system for packing and handling glass sheets as claimed in claim 12, wherein the supporting posts are located in a horizontally extending position with respect to the third support profile.

14. The system for packing and handling glass sheets as claimed in claim 7, wherein the third support profile includes an angular piece forming a generally 90° angle with respect to the alignment of each one of the structural profiles, to-retain a series of glass sheet packages.

15. The system for packing and handling glass sheets as claimed in claim 7, wherein the third support profile comprises adjusting means at each end of said third support profile, whereby said supporting frame can be adjusted over a platform of a loading truck.

16. The system for packing and handling glass sheets as claimed in claim 15, wherein the adjusting means comprise fastening means for coupling on the platform of a loading truck.

17. The system for packing and handling glass sheets as claimed in claim 7, wherein each first section support and each second section support are in a pyramidal form.

18. The system for packing and handling glass sheets as claimed in claim 7, wherein the assembly between the first section support, the second section support and the crossing members are carried out by means of a nut and screw assembly.

19. The system for packing and handling glass sheets as claimed in claim 7, wherein the structural profiles comprise an upper folding section.

20. The system for packing and handling glass sheets as claimed in claim 7, wherein the upper folding section and an upper part of the first section support and the second section support are connected by means of a joint.

* * * * *